United States Patent

[11] 3,575,454

[72] Inventor Martha C. Meeker
   5768 N. Ewing, Indianapolis, Ind. 46220
[21] Appl. No. 837,968
[22] Filed Apr. 1, 1969
[45] Patented Apr. 20, 1971
   Continuation-in-part of application Ser. No. 556,187, June 8, 1966, now abandoned.

[54] BUMPER SHOCK-ABSORBING VEHICLE
   2 Claims, 11 Drawing Figs.
[52] U.S. Cl. ............................................. 293/62,
   104/118, 104/120, 104/148, 104/246, 105/49,
   105/145, 105/215, 267/65, 280/124, 293/71,
   293/72, 293/85, 293/88, 296/35
[51] Int. Cl. ..................................... B60r 19/08,
   B61f 19/04, B62d 23/00
[50] Field of Search .................................. 104/245;
   105/1, 26, 30, 74, 215 (C); 267/65; 280/124;
   293/63; 296/35; 104/118, 120, 148, 246; 105/49,
   145, 215; 293/62, 71, 72, 85, 88

[56] References Cited
   UNITED STATES PATENTS

| | | | |
|---|---|---|---|
| 148,846 | 3/1874 | Rankin | 105/145 |
| 208,113 | 9/1878 | Mueller | 105/217X |
| 287,458 | 10/1883 | Olmsted | 104/246 |
| 596,227 | 12/1897 | Andrews | 105/396 |
| 891,882 | 6/1908 | Valentine | 105/30 |
| 1,289,728 | 12/1918 | Giles | 267/65 |
| 1,448,119 | 3/1923 | Hutton | 104/246X |
| 1,974,171 | 9/1934 | Bizzarri | 267/65X |
| 2,541,364 | 2/1951 | Jurasevich | 293/62 |
| 2,722,987 | 11/1955 | Dean et al. | 280/124 |
| 2,788,998 | 4/1957 | Wilfert | 293/88X |
| 2,845,144 | 7/1958 | Bohn | 293/63X |
| 2,864,318 | 12/1958 | Toulmin, Jr. | 105/26X |
| 2,896,735 | 7/1959 | Bohn | 293/63X |
| 2,969,751 | 7/1961 | Toulmin, Jr. | 105/74 |
| 2,994,356 | 8/1961 | Fleming | 293/62X |
| 3,014,434 | 12/1961 | Cox | 104/120X |
| 3,147,714 | 9/1964 | Appelt et al. | 105/145 |
| 3,233,559 | 2/1966 | Smith et al. | 105/1 |
| 3,307,867 | 3/1967 | McGovern | 293/88 |
| 3,333,550 | 8/1967 | Gorham | 104/120X |
| 3,353,504 | 11/1967 | Kersey et al. | 105/215(C) |
| 3,447,481 | 6/1969 | Gorham | 104/120 |

Primary Examiner—Arthur L. La Point
Assistant Examiner—Howard Beltran
Attorney—Woodard, Weikart, Emhardt & Naughton

ABSTRACT: A vehicle operable on conventional roads under driver control and on a monorail system under other than driver control. The vehicle has a body mounted to a frame by frangible members. Wheels are rotatably mounted to the frame for supporting the vehicle. Plungers having spring-biased pistons are mounted to the frame and are aligned with rubber grommets secured to a shell extending down from and surrounding the body. A rubber bumper is mounted to the outside surface of the shell. A rail-engaging carriage is secured to the underside of the vehicle.

Patented April 20, 1971

INVENTOR.
MARTHA CANTWELL MEEKER

BY
Woodard, Weikart, Emhardt & Naughton
Attorneys

Patented April 20, 1971

INVENTOR
MARTHA CANTWELL MEEKER

BY Woodard, Weikart, Emhardt & Naughton
Attorneys

Patented April 20, 1971

INVENTOR
MARTHA CANTWELL MEEKER

BY
Woodard, Weikart, Emhardt & Naughton
Attorneys

INVENTOR.
MARTHA CANTWELL MEEKER
BY
Woodard, Weikart, Emhardt & Naughton
ATTORNEYS

BUMPER SHOCK-ABSORBING VEHICLE

CROSS-REFERENCE TO RELATED APPLICATION

The present invention relates to a safety vehicle, and is a continuation-in-part of application Ser. No. 556,187, filed June 8, 1966, now abandoned.

BACKGROUND OF THE INVENTION

The carnage which occurs daily on the roads and highways of this country is an ever-present problem. The primary object of the present invention is to provide a vehicle which is safer than presently available vehicles. One of the problems that must be solved in order to reduce death and injury on the highways is driver error. A further object of the present invention is to provide a vehicle which makes possible taking away the control of the vehicle from the driver at high speed and placing the control externally of the vehicle to reduce the damage caused by driver error yet which permits operation at low speeds in similar fashion to conventional automobiles. Related objects and advantages will become apparent as the description proceeds.

One embodiment of this invention might involve a vehicle comprising a frame, a body which is circular in cross section, wheels rotatably mounted on said frame for supporting the vehicle, means securing said body to said frame, said means being arranged to fail when the body is acted upon by a substantial force whereby said body is free to roll about the axis of said circular cross section.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figures 1, 2, 3:
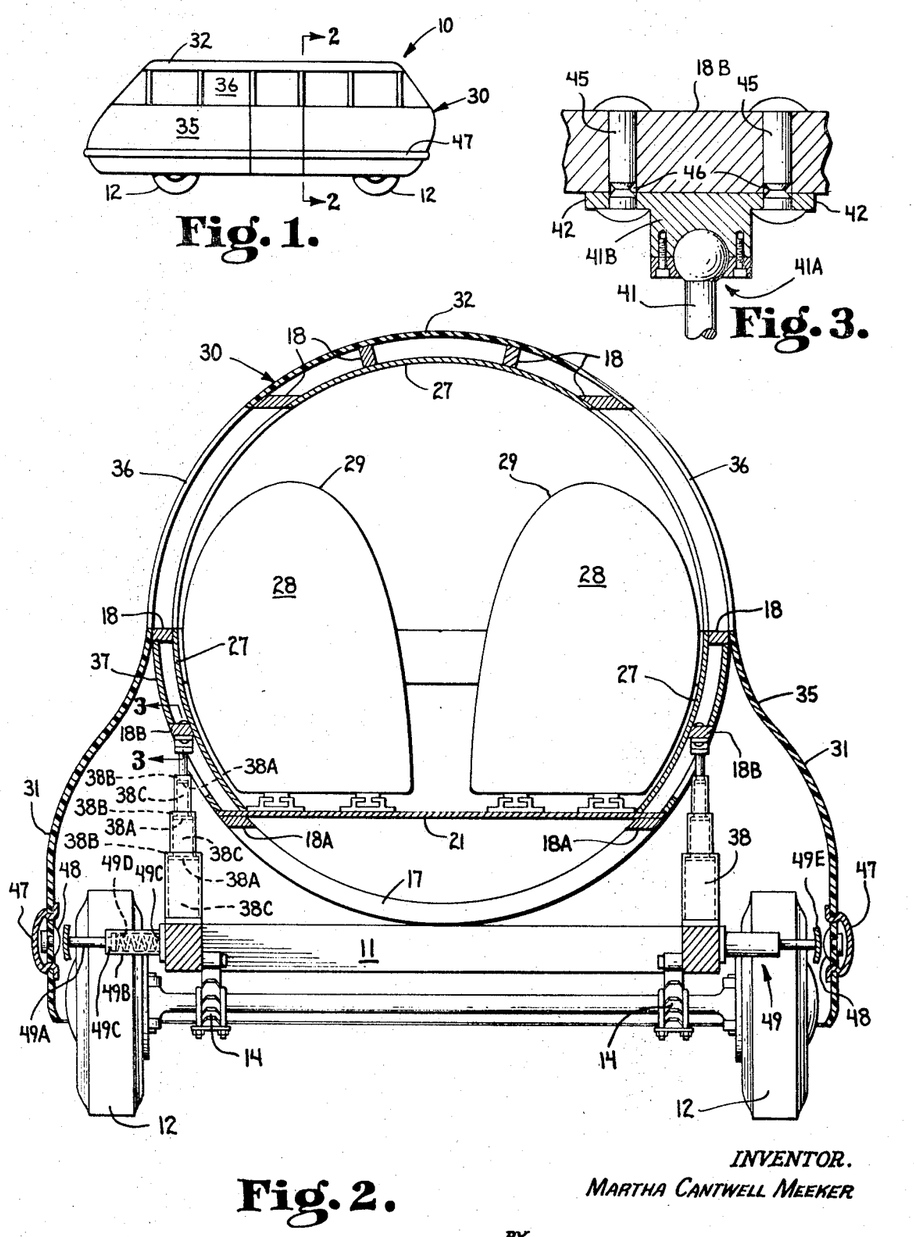
FIG. 1 is a side elevation of the subject vehicle.
FIG. 2 is a transverse section taken along lines 2-2 of FIG. 1 and viewed in the direction of the arrows.
FIG. 3 is a sectional view of a body-mounting element taken along lines 3-3 of FIG. 2 and viewed in the direction of the arrows.

Referring now to the drawings, the safety vehicle 10 has a heavy-duty frame 11 having secured thereto the wheels 12 and engine 15. The wheels are secured to the frame 11 in conventional fashion by springs 14 and by shocks (not shown). The body, generally referred to by numeral 16 comprises circular bulkheads 17 braced by longitudinally extending struts 18, 18A, 18B and 18C fixed thereto. Additional bracing members (not shown) may also be provided. The rearmost bulkhead 20 is semicircular rather than circular to accommodate the engine 15. A floor 21 mounted to struts 18A spans the lower portion of the body from the front 23 of the vehicle to the bulkhead 17A. A vertical wall 22 secured to the bulkhead 17A and a rear deck 25 form an engine compartment 26. Suitable interior walls or upholstery 27 and appropriate safety seats 28 with upwardly projecting head-supporting portions 29 are mounted in the interior of the body passenger enclosure. There is also provided in the body suitable conventional control apparatus for steering the vehicle by the front wheels 12, for braking the wheels and for controlling engine 15. Since this apparatus is conventional, it will not be described further herein.

An outer shell 30 is mounted to the upper half of the body framework and flares out at 31 to cover the wheels 12. In the illustrated embodiment the outer body shell 30 is of one-piece construction except for a suitable entry door, the material being a transparent plastic suitably painted on the roof 32 and lower body portion 35 and with an unpainted portion 36 forming the windowed area. Steelplates 37 mounted to the bulkheads 17 and struts 18 surround the passenger compartment from window to floor level to provide passenger protection from piercing objects in the event of collision.

The body 16 is mounted to frame 11 at four points by four telescoping air suspension jacks 38. The jacks can be projected to the position of FIG. 2 wherein each except the lowermost telescoping member has an outwardly projecting flange 38A which engages an inturned flange 38B on the next larger telescoping member. The hollow portions 38C inside the telescoping members are filled with air under pressure by a pump (not shown) capable of maintaining the air pressure at a constant desired value. The manner of attachment of the suspension jacks 38 to the body is an important safety feature of the present vehicle. As shown in FIG. 3, the upper distal end 41 of the air jack piston is secured by a ball-and-socket connection 41A to a member 41B having flanges 42 which abut the underside of strut 18B. The flanges 42 and strut 18B are appropriately apertured to receive rivets 45, each rivet having a necked down portion 46 located near the abutting surfaces of flanges 42 and strut 18B. The necked down portion 46 of rivets 45 are designed to break or shear when subjected to a force of a degree normally encountered in a major collision.

Figure 7:
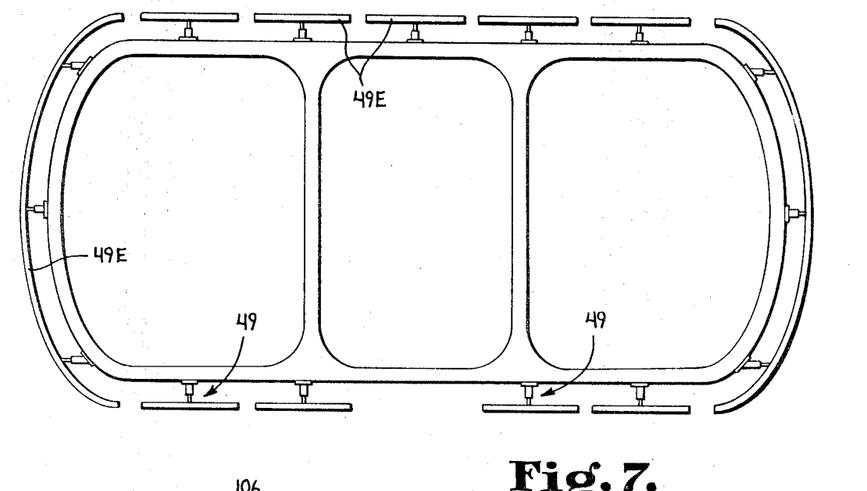
FIG. 7 is a top plan view of the frame and plunger arrangement of the vehicle.
Figure 9:
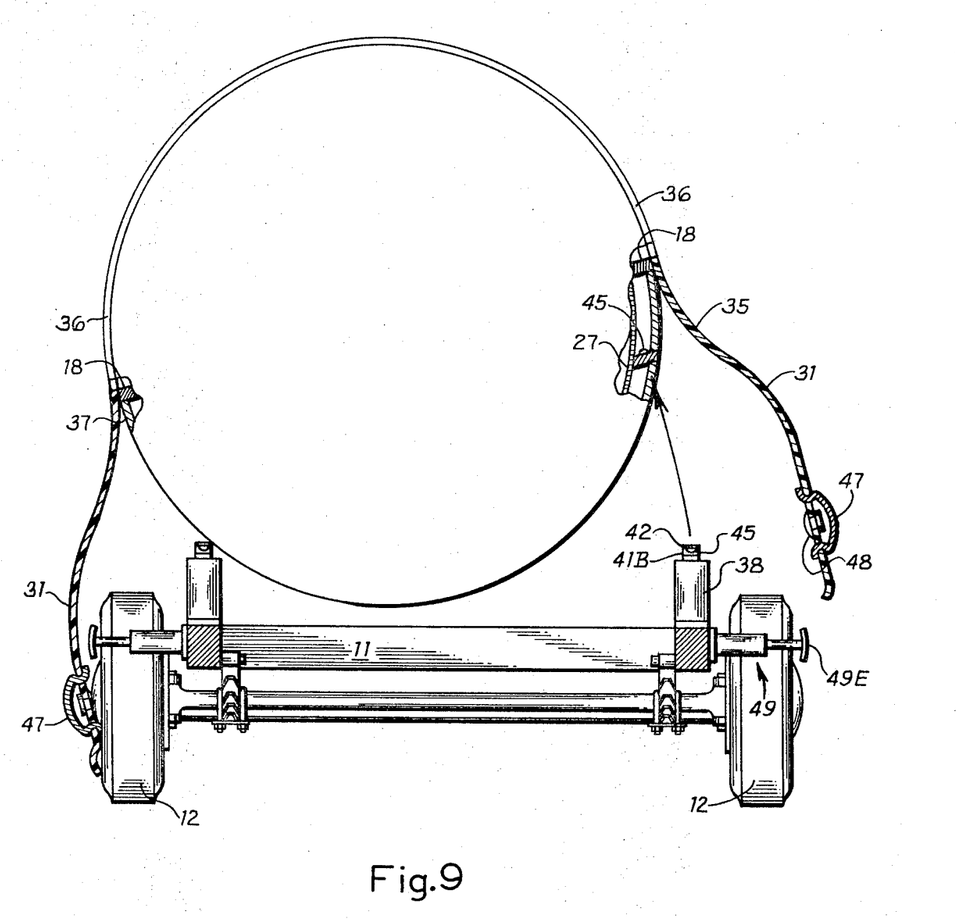
FIG. 9 is a view similar to FIG. 2 but after failure of the means securing the body to the frame.

A rubber bumper 47 surrounds the body in the lower region of skirt 31. A plurality of rubber grommets 48 are spaced around the skirt under the bumper 47, each grommet being axially aligned (when the vehicle is in the operating position of FIG. 2) with a respective spring-loaded plunger 49 mounted on frame 11. Each plunger 49 incorporates a piston 49A, a cylinder 49B providing suitable limits 49C for the piston and a spring 49D acting between the cylinder and piston. The pistonhead 49E varies in length as shown in FIG. 7. Relatively small impacts upon the sides of the vehicle are absorbed by bumpers 47, grommets 48 and plunger 49. Relatively violent impacts, however, cause the body 16 to separate either partially or completely from the frame by failure of rivets 45 thus preventing or reducing the possibility of the body 16 being smashed inwardly to injure the belted passengers. Also, if the body is struck by a hard blow from the side, the body will be caused to separate from the frame (as illustrated in FIG. 9) and to roll by reason of its circular cross-sectional configuration. The passengers are thus protected by rolling away from the impact.

Figures 4, 6:
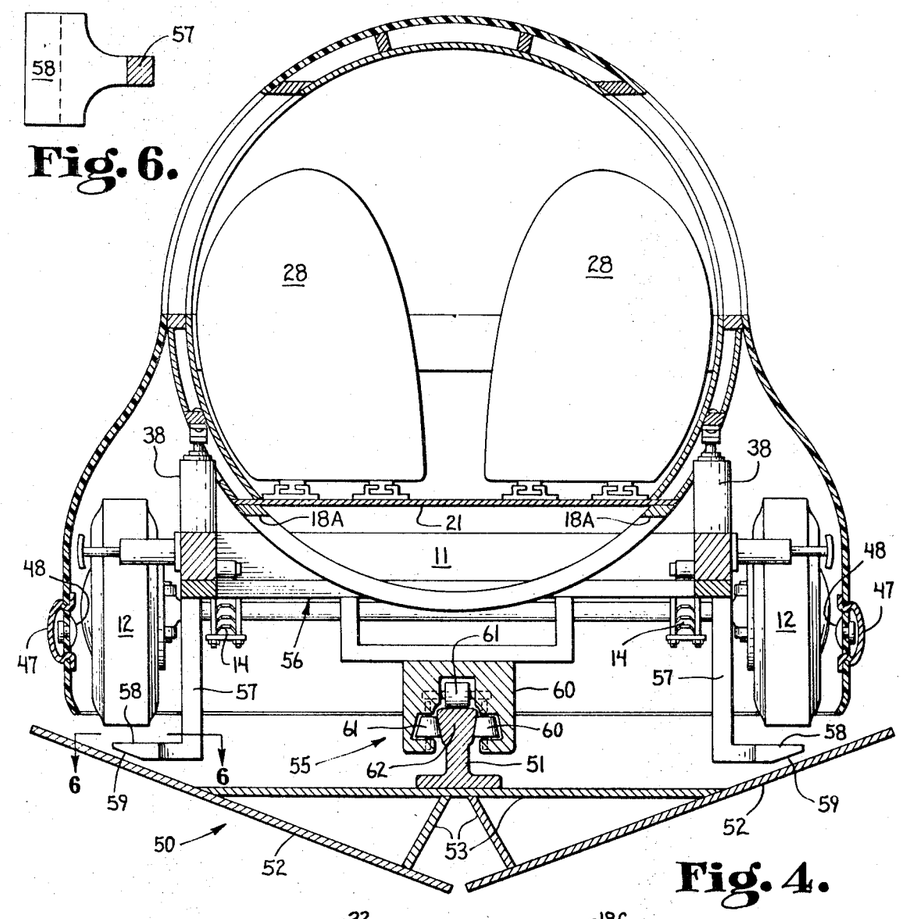
FIG. 4 is a sectional view similar to FIG. 2 but with the body lowered over the frame and showing the frame in connection with a rail transport device.
FIG. 6 is a fragmentary detail view of a portion of the structure of FIG. 5.
Figure 5:
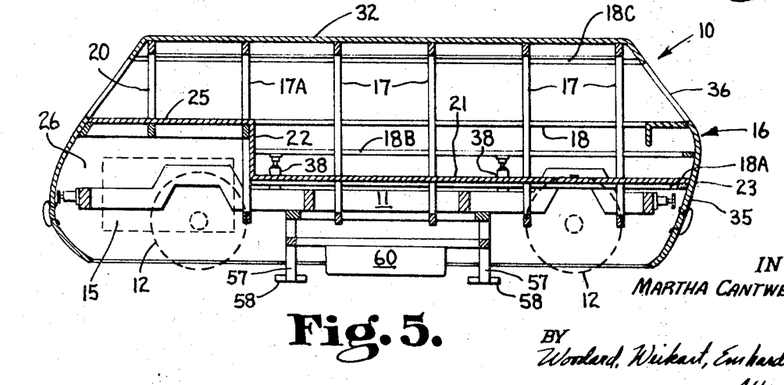
FIG. 5 is a longitudinal section of the vehicle excluding interior details to better illustrate the relationship between the body construction and the frame and also showing the frame in connection with the rail transport device.

Referring to FIG. 4, there is shown a track construction or trackway 50 which includes a rail 51 fixedly mounted upon and centrally located between sloping retaining walls 52 by means of support member 53. To use the subject vehicle on the rail transport system, a rail-engaging carriage 55 is secured to the underside of frame 11 and includes in the illustrated embodiment a rectangular frame 56 having L-shaped guide members 57 depending from each of the four corners of the rectangular portion of the frame. The distal end 58 of each L-shaped member is flared or tapered at 59 at an angle corresponding to the slope of retaining walls 52 as shown in FIG. 6. Actual contact with rail 51 is made through member 60 which is secured to and forms a part of rail-engaging carriage 55 and which has a series of inwardly projecting rollers 61 facing the top and side surfaces of the head 62 of rail 51. The keystone-headed rail 62 provides positive limits of rotation of the vehicle around the vertical and horizontal axis.

The vehicle of the present invention is intended to operate at slow speed in town under the control of a driver in similar fashion to conventional vehicles. At the high speeds used in intercity travel, however, the vehicle moves on track construction 50. When it is desired to operate the vehicle on the trackway 50, suspension jacks 38 are partially bled to a lower pressure whereby the body structure is lowered downwardly as shown in FIG. 4 to provide a lower center of gravity and a better aerodynamic contour for high-speed rail travel. It should be understood that the suspension jacks when in the position of FIG. 4 still contain air pressure so as to provide the cushioning effect between the body and frame. The cooperation of guide members 57 and sloping walls 52 provides positive limits of rotation of the vehicle around the longitudinal axis of the rail. An alternative embodiment of the invention might incorporate rollers or other friction-reducing components mounted on or in the distal ends of the guide members 57.

When the vehicle is on the rail 51 it is powered or moved in any suitable fashion. For example, it may be powered electrically or it may be powered by the engine 15 (through wheels 12) or possibly even by a jet engine. It is intended, however, that as much as possible of the control of the vehicle be removed from the passengers and effected externally of the vehicle in order to cut down driver error which can be very dangerous at the high speeds intended for such rail travel. Of course, the rail 51 removes the steering from the control of the passengers in the vehicle and other external control may be provided.

The invention can take various forms. For example, the body 10 has been described above as having a shape of circular cross section, which shape is illustrated as being either cylindrical or cigar shaped. The body may also have a shape of circular cross section which is spherical in total shape so that the striking of the body by an external object as occurs in a collision will cause the spherical body to roll no matter what the direction of the object when it strikes the body. In other words, the body 16 may be struck head on by another vehicle and by reason of its spherical shape it could then roll backwardly away from the frame 11.

The preferable term for the safety vehicle of the present invention is monocar, although it may be referred to as monobus or a monotruck depending upon its function. The monocar of the present invention may be formed from any desirable material such as aluminum and steel, although preferably the rear portion of the body and more particularly the bulkheads and braces in the rear portion of the body may be formed of aluminum while the bulkheads and braces in the forward portion of the body are formed of steel. Of course, the purpose in using aluminum and steel in this fashion is to balance the monocar and to insure that the engine placed in the rear portion of the monocar does not cause too much of the weight to be on the rear wheels of the monocar.

When the monocar is operating on the carriage 55 and on the trackway 50, the engine 15 of the monocar may not be used. Such a situation would occur where the monocar is propelled by some sort of electrical charge effect. In such a situation, batteries can be used for driving the pump which provides the pneumatic air pressure to the suspension jacks 38.

Various other features can be used in connection with the above-described basic design. For example, the monocar may be provided with a three-speed governor. This governor would permit the car to operate on conventional roads at the monocar's top speed at setting A, at 55 m.p.h. at setting B and at 35 m.p.h. at setting C. The monocar may be also equipped with blue and amber lights, front and rear, which may be prominently placed and bright. If the driver-set governor is at setting A, no light would show. For B setting, however, a blue light would be displayed, and for the C setting an amber light. This would greatly assist traffic control officers and also would keep heavy-footed drivers within speed limits.

Although for simplicity the drawings do not show padding within the body, it is intended that the interior of the body will be substantially padded to protect the passengers. Also the monocar of the present invention is provided with effective seat belts. The road stability of the monocar is greatly increased by the heavy lower frame and by the wide tread of the wheels. Preferably the single entry for the monocar is located on the curb side, that is, on the right if the vehicle is intended for use in the United States and is placed by design away from all of the seats so that a door lock failure would not necessarily cause a passenger to be thrown out of the door.

Other safety features provided in the monocar may be the location of each of the seats 28 so that the bulkheads act as roll bars and extend over the heads of the passengers seated within the individual seats. Another desirable feature provided with the monocar can be green rear running lights which are used in conjunction with conventional red braking lights. As a further alternative, the red braking lights may be operated automatically by the position of the accelerator pedal. Other standard safety features preferably are provided such as headlights, brakes, turn signals, windshield wipers, a horn and so on. The monocar is also appropriately air-conditioned and heated or, alternatively, the windows of the monocar are designed to open horizontally.

The monocar may take various forms and the manner of placing it on the rail 62 may also take various forms. One conceivable procedure for placing the monocar on the rail 62 is described below. The pneumatic jacks 38 are adjusted so that the body 16 is lowered approximately 8 inches. This would be accomplished by lowering the pressure within the jacks to a lower constant value by adjustment of the pneumatic pump. The pump is then actuated to switch the pump to battery operation as above suggested so that the pump is no longer operated by the engine 15. It is assumed, of course, that the vehicle is to be driven on the rail 62 by electrical means. The carriage 55 is secured beneath the monocar. The springs 14 are then clamped so that the wheels 12 are in the upper position illustrated in FIG. 4. A two-way radio may then be placed in the monocar for the duration of the trip. The monocar may then be placed on a catapult, possibly in a backward position, or on some other mechanical device and launched on to the rail 62 so that the monocar arrives on the rail at rail speed.

As mentioned above, the monorail system is intended for intercity travel. Thus, terminals may be located within the heart of the various cities along the route. The monorail system can consist of a network of elevated rails built for high-speed cross-country travel wherein two rails are required between any two points, one rail being provided for each direction of travel. Preferably the travel on the rail would be accomplished at a high constant speed which can be done, for example, by some sort of electrical means.

One such means of propulsion might incorporate a series of boxes placed on each side of the rail, said boxes carrying a positive charge forward and a negative charge rearward. The boxes would alternately pull and push the monocar's lower frame, which would also be electrically charged, as the monocar approaches and passes each charged box. Of course, upgrades would require an increase in voltage and downgrades would require a decrease in voltage in order to maintain the monocare's constant speed. In an emergency the power can be reversed in order to stop the monocar. Also, an emergency handbrake is provided which is passenger operated to maintain the stopped vehicle in a static position when it is stopped on an inclined portion of the rail.

In order to insure that a plurality of monocars operating on the same rail are all spaced at a uniform distance apart on the rail and also to insure that any monocar being catapulted on to the rail would arrive on the rail only when a vacancy occurs, the timing of the catapult firing would necessarily be electronically controlled. In other words, the monocars would have to be programmed on to and off of the monorail.

It should be understood that only the monocar with its two-setting pneumatic jacks can be placed upon the monorail. Thus, the carriage 55 secured to the underside of the monocar becomes one unit with the monocar's underframe. This one unit then receives all the shock and blows created by any engagement of the L-shaped members 57 with the trackway 50. These jars and shocks are absorbed by the pneumatic jacks 38, thereby assuring the passengers a smooth ride within the body 16.

It is envisioned that eventually, when practical, the monocar would not be mechanically fitted to the rail, but instead the existing rail would be charged so as to set up an electrostatic field on which the monocar would travel in a relatively friction-free condition. It is believed that in such an arrangement, the speed of a monocar could be increased possibly in excess of 200 m.p.h.

Figure 10:
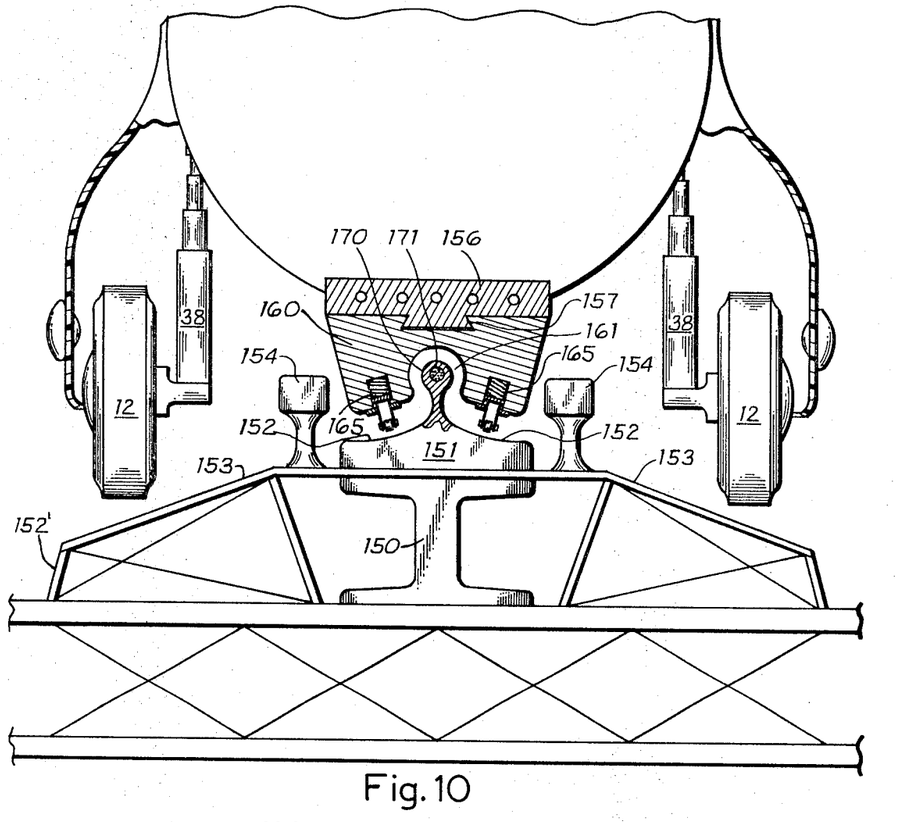
FIG. 10 is a partial sectional view similar to FIG. 4 but illustrating a different embodiment of the frame and rail transport means.

An embodiment adapted for use with an electrostatic system is illustrated in FIG. 10. FIG. 10 shows a track 150 mounted on a superstructure 152', preferably elevated. Track 150 includes a rail 151 having surfaces 152 and a generally horizontal member 153. Electromagnets 154 are supported by member 153 at regular intervals along the length of the track 150. Member 153 provides a support limiting movement of the vehicle about its longitudinal axis.

Fixtures 156 are rigidly attached to the underside of the vehicle. With four-wheel drive vehicles, fixtures 156 are attached to the underside and center of the front and rear axles. On the more conventional rear-wheel drive vehicle, fixtures 156 are attached on the underside and center of the rear axle and on the underside of frame 16 between the front wheels. Fixtures 156 are adapted to hold carriage member 164 when the vehicle travels along a rail. A covering, such as plastic, can be put over the fixture when not in use to protect it from debris and the elements.

Figure 11:
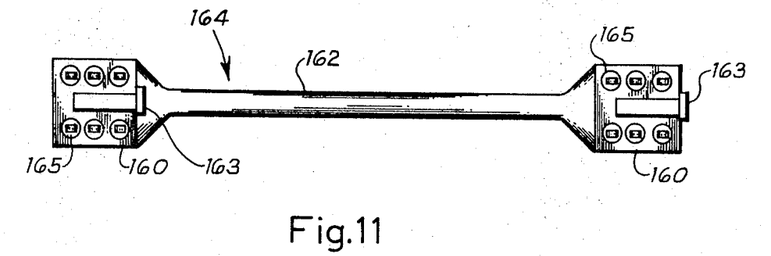
FIG. 11 is a top plan view of a carriage member.

Fixture 156 has a lower protrusion 157 in the shape of a truncated triangular solid. Protrusion 157 is adapted to securely fit into and engage a solid metal block 160 which is permanently charged. A block 160 is held by each of the fixtures 156. The blocks 160 are rigidly interconnected by a member 162 extending longitudinally between them and above rail 151 (FIG. 11). Plates 163 or other suitable restraining means are provided to prevent relative movement between fixtures 156 and carriage member 164.

A groove 161 adapted to fit over rail 151 extends longitudinally through the undersides of blocks 160. Stabilizers 165 are provided on the undersides of blocks 160. Stabilizers 165 each include a spring-loaded rod with a roller at its end. The rollers will contact rail surfaces 152 in the event of rotational movement of the vehicle and thus limit and stabilize such movement. Rail 151 itself also serves to limit rotational movement of the vehicle.

The uppermost portion 170 of rail 151 is of generally circular cross section. An electrical cable 171 extends longitudinally through the portion 170 of rail 151. Current through cable 171 creates an electrostatic field about the cable and hence about rail 151. By maintaining proper charge relationships between the rail and blocks 160, a repulsive force can be created to properly locate and space groove 161 with respect to rail 151. The vehicle can then be moved along track 150, as previously described, in an essentially friction-free path.

It will be evident from the above description that the present invention provides a safe means of cross-country travel which removes the decisionmaking from the individual driver and, thus, makes possible a greater level of safety than that even achieved by airlines, buses and conventional rail transportation. It is believed that by proper design of the outside skin of the monocar that wind resistance can be substantially cut down. Also, by placing the monocar on the rail backwards as mentioned above, that is, by catapulting it on to the rail with the engine forward, the front end of the monocar better holds to the rail at high speed.

It can be appreciated that those using such means of intercity transportation as described above can arrive at home safe and rested because it is not necessary for the passengers who are traveling in the monocar when it is on the trackway to guide the monocar or to make decisions in controlling the monocar. Instead, the occupants or passengers of the monocar can do paperwork at a suitable table provided in the monocar. Also, a vacationing family can arrive safely and rested at its destination ready to start a camping trip. For this purpose, the seats of the monocar may be arranged so that they fold down in order to make the monocar into a sleeper.

The monocar of the present invention, when used as a monotruck, makes possible high-speed dock-to-dock freight service for business and industry. The great advantage here provided is that the freight does not have to be transferred at railroad, truck or air terminals to local delivery trucks. Since a monocar arrangement and rail network as above described takes a substantial amount of time to evolve, it is envisioned that the first sections or first applications of the present invention would offer regularly scheduled monobus transportation with monocars and monotrucks being made available to the public on a rental basis. Of course, once established, the monovehicles could be offered for sale to the general public.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

Figure 8:
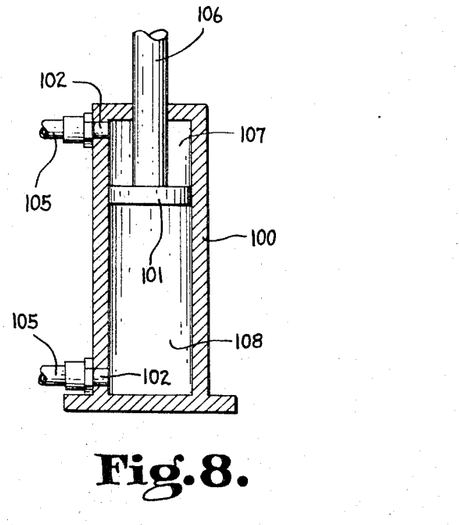
FIG. 8 is a longitudinal sectional view of an alternative form of suspension arrangement for supporting the body on the frame.

For example, an alternative form of suspension arrangement or air suspension jack is shown in FIG. 8 and includes a cylinder 100 with a piston 101. The cylinder has two ports 102 to which are coupled air pressure supply lines 105. The embodiment of the monocar illustrated in fragmentary fashion in FIG. 8 is identical to the monocar of FIG. 2, except four cylinders 100, pistons 101 and piston rods 106 are used to replace the four suspension jacks 38 of FIG. 2. Thus the cylinder 100 is secured to the frame and the piston rod to the body in the manner illustrated in FIG. 3. The advantage of the embodiment of FIG. 8 is the fact that air pressure can be placed in the cylinder 100 on opposite sides of the piston at 107 and 108 and the air pressure can be of any desired amount to produce any desired cushioning effect when the monocar is in the position, for example, of FIG. 4.

"Plactic," as used herein, means any tough but flexible synthetic material, including those reinforced with glass fibers or steel.

It is to be understood that electrical cable 171 is a general term to cover any electrical means producing an upward field upon which carriage 160 may be supported. Such a cable may include a series of small electromagnets placed continuously along the cable. The shape of railhead 151 and groove 161 may take various forms depending on the means used to develop said upward field of the cable 171.

It should be understood that various changes can be made in the apparatus without departing from the scope of the invention, such as, for example, locating the engine in the front or the rear of the vehicle. It should be emphasized that the system of this invention will make possible the creation of distant bedroom suburbs for any given metropolitan area thereby reversing the trend of overcrowding in our present urban areas and also will make possible the creation of new cities in areas not now too accessible.

I claim:

1. A vehicle comprising a frame, a body, means securing said body to said frame, wheels rotatably mounted on said frame for supporting the vehicle, plungers mounted on the frame and each including outwardly projecting spring-biased pistons, a shell covering said body and extending over said plungers and wheels, a rubber bumper secured to said shell and surrounding said vehicle, and a plurality of rubber grommets secured to said shell beneath said rubber bumper, said grommets each being aligned to engage with but spaced from a respective one of said plungers.

2. The vehicle of claim 1 wherein said means comprises frangible members mounted to said frame securing said body to said frame, said members arranged to fail when said body is acted upon by a substantial force.

UNITED STATES PATENT OFFICE
CERTIFICATE OF CORRECTION

Patent No. 3,575,454​​​​​​​​​​​​​​​​Dated April 20, 1971

Inventor(s) Martha C. Meeker

It is certified that error appears in the above-identified patent and that said Letters Patent are hereby corrected as shown below:

The title "BUMPER SHOCK ABSORBING VEHICLE" should be -- SHOCK ABSORBING VEHICLE BUMPER--

Column 2, line 60 "plunger" should be --plungers--

Column 2, line 73 "member" should be --members--

Column 6, line 56, "Plactic" should be --"Plastic"--

Column 6, line 70 "It should be emphasized" should be --It should also be emphasized--

Signed and sealed this 21st day of December 1971

(SEAL)
Attest:

EDWARD M. FLETCHER, JR.​​​​​ROBERT GOTTSCHALK
Attesting Officer​​​​​​​Acting Commissioner of Pat